US012541412B2

(12) United States Patent
Rajagopal et al.

(10) Patent No.: US 12,541,412 B2
(45) Date of Patent: Feb. 3, 2026

(54) SYSTEM MANAGEMENT MODE (SMM) ERROR HANDLER

(71) Applicant: Intel Corporation, Santa Clara, CA (US)

(72) Inventors: Pannerkumar Rajagopal, Bangalore (IN); Santhosh Raghuram Krishnaswamy, Coimbatore (IN); Siddhartha Selvaraj, Coimbatore (IN); Anshul Soni, Mandsaur (IN); Toby Zimmerman, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 591 days.

(21) Appl. No.: 17/724,811

(22) Filed: Apr. 20, 2022

(65) Prior Publication Data

US 2023/0342234 A1  Oct. 26, 2023

(51) Int. Cl.
  *G06F 11/07* (2006.01)
  *G06F 9/44* (2018.01)
  *G06F 9/4401* (2018.01)

(52) U.S. Cl.
  CPC ........ *G06F 11/0766* (2013.01); *G06F 9/4406* (2013.01); *G06F 11/0721* (2013.01)

(58) Field of Classification Search
  CPC . G06F 11/0766; G06F 9/4406; G06F 11/0721
  See application file for complete search history.

(56) References Cited

U.S. PATENT DOCUMENTS

| 2003/0070115 | A1* | 4/2003 | Nguyen | G06F 11/0787 714/23 |
| 2004/0003313 | A1* | 1/2004 | Ramirez | G06F 11/0721 714/6.24 |
| 2022/0318087 | A1* | 10/2022 | Hong | G06F 11/0793 |

OTHER PUBLICATIONS

Milan Stanojevic et al., "How to Fix: Computer Restarted Unexpectedly or Encountered an Unexpected Error", available online at <https://windowsreport.com/computer-restarted-unexpectedly/>, Aug. 7, 2025, 16 pages.
Super User, "How do I identify the root cause of unexpected reboots?", available online at <https://superuser.com/questions/1398999/how-do-i-identify-the-root-cause-of-unexpected-reboots>, 2025, 7 pages.

* cited by examiner

*Primary Examiner* — Stefan Stoynov
(74) *Attorney, Agent, or Firm* — Nicholson De Vos Webster & Elliott LLP

(57) ABSTRACT

The technology describe herein includes upon entering a mode of a processor that is not visible to an operating system (OS), setting a flag indicating entry into the mode and saving an identifier (ID) of an error causing entry into the mode; and responsive to a system reset initiation while in the mode, booting a basic input/output system (BIOS), creating an error record to be accessible to the OS after booting, the error record including the flag and the error ID, and booting the OS.

21 Claims, 6 Drawing Sheets

SYSTEM MANAGEMENT MODE (SMM) ERROR HANDLER

FIELD OF THE DISCLOSURE

This disclosure relates generally to error handling in a computing system, and more particularly, to reporting system management mode (SMM) errors after re-booting of the computing system.

BACKGROUND

System Management Mode (R&M) is an operating mode of some central processing units (CPUs), such as x86 processors, in which all normal execution, including execution of the operating system (OS), is suspended. An alternate software system, which usually resides in the computer's firmware, or a hardware-assisted debugger, is then executed with high privileges. SMM is a special-purpose operating mode provided for handling system-wide functions like power management, system hardware control or proprietary original equipment manufacturer (OEM) designed code. 11t is intended for use only by system firmware (Basic Input/Output System (BIOS) or Unified Extensible Firmware interface), not by applications software or general-purpose systems software. One benefit of SMM is that it offers a distinct and easily isolated processor environment that operates transparently to the OS and software applications.

In order to achieve this transparency, SMM imposes certain rules. The SMM can only be entered through a System Management Interrupt (SMI). The processor executes the SMM code in a separate address space that is inaccessible to other operating modes of the CPU by the firmware. One disadvantage of this transparency is that when an error occurs during SMM and the computing system is re-booted, there is no mechanism to identify and report the SMM error causing the reboot to the OS after rebooting.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
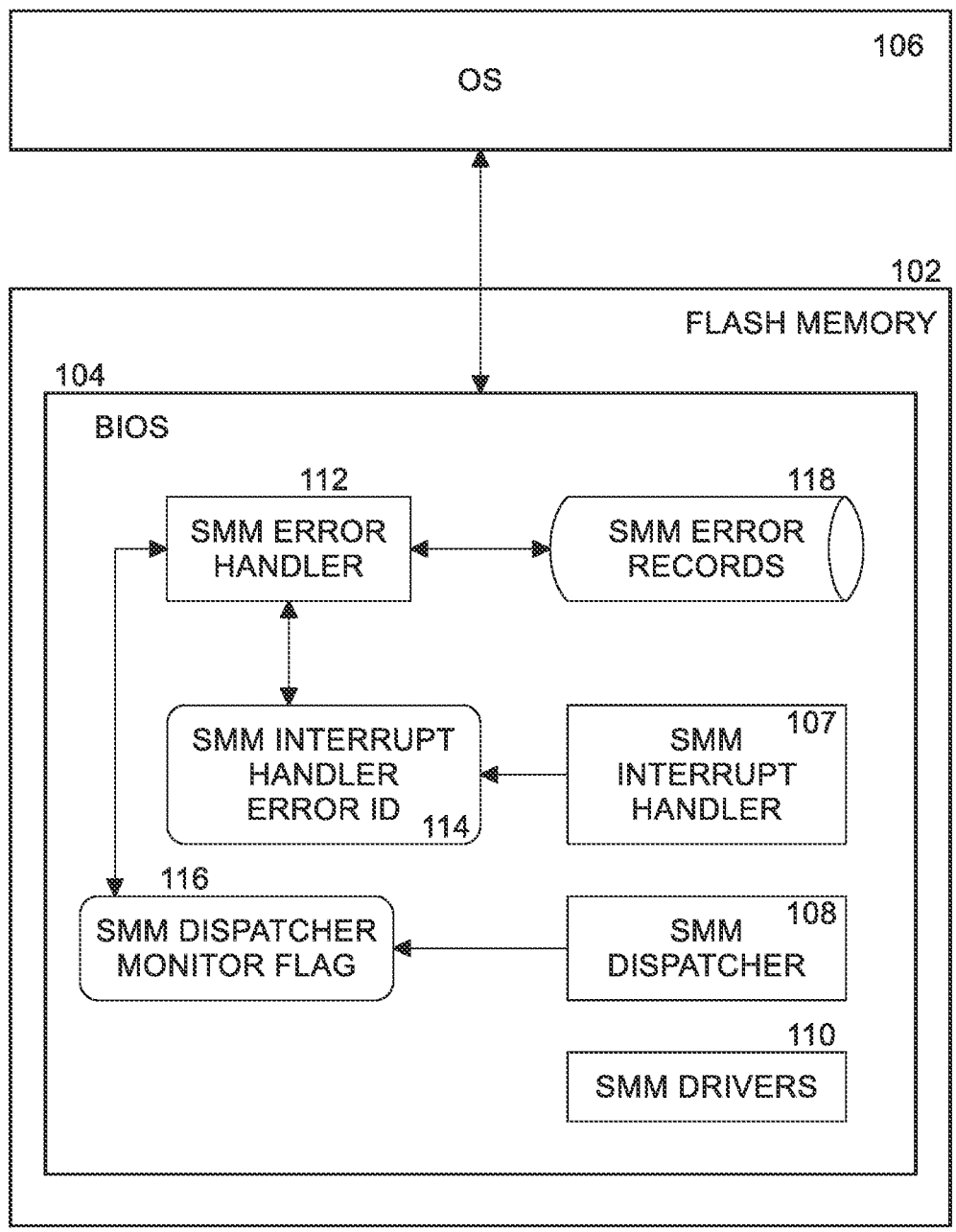
FIG. 1 is a diagram of a computing system according to some embodiments.

The technology described herein includes a method, apparatus and machine-readable medium storing instructions to provide an interface to the OS to expand the OS's ability to identify and handle unexpected resets of a computing system.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

System Management Mode (SMM) operation of a processor is transparent to OS. Some errors encountered during SMM result in a reboot of a computing system. If an unexpected reboot happens when the computing system is in SMM mode, there is no mechanism for the OS to capture information regarding the specific error(s) and/or circumstances associated with the reboot. This scenario will manifest itself as an unexpected system reset in an OS system event monitor and will not provide any opportunity for identification of the root cause of the error and communication and/or handling of this identification. This is problematic for users when their computing systems suddenly reboot without a specification indication of what went wrong.

In existing systems, when an SMM error occurs, an SMI is generated by the processor resulting in an execution context change to the BIOS. The BIOS notifies the OS to save the current context and switch to SMM. The BIOS performs error handling and when SMM execution is complete notifies the OS to change the context back to OS space. The BIOS then clears the SMI and the processor resumes normal processing. In some cases, an unexpected reset (reboot) is triggered while SMI execution is not complete. This results in the error being logged only as unexpected prior to the reboot. Once the system is reset, typically multiple debug experiments are needed so that information technology (IT) personnel can attempt to deduce the actual specific cause of the error. This is time consuming and resource intensive.

The technology described herein solves this problem by monitoring and capturing information about every SMM entry and exit, monitoring and capturing information about SMM handlers, checking (after reset/recovery and before SMM initialization) if the last SMM exit state was successful, and if the last SWIM exit failed, providing the SMM operating context information at the time of failure to the OS (e.g., failing signature or identifier). The OS can then read provided information for system event logging. This mechanism provides visibility into SMM failures, which can be identified. In some cases, corrective actions may then be taken by the OS to improve the operating conditions of the computing system.

Although the technology is described herein with reference to SWIM, the technology is also applicable to scenarios of any other mode that is not visible to the OS.

This technology identifies high volume validation failures that arise in SWIM, provides the capability for users to get a specific reason for SWIM failures rather than a generic, unhelpful error code, and provides a mechanism to classify the failure (for example, as due to driver updates or basic input/output (I/O) system (BIOS) updates) and reduce system downtime due to SMM failures. This technology also guarantees the availability of the system SWIM context information post recovery (e.g., post reboot), provides the ability to use user level applications for telemetry data collection regarding system errors resulting in reboots, and enables a faster turnaround time for computing system manufacturers to address SWIM related system failures.

FIG. 1 is a diagram of a computing system 100 according to some embodiments. To aid in understanding, some components of computing system 100 are omitted from FIG. 1. Computing system 100 includes flash memory 102 to store BIOS 104 as is well known. Flash memory 102 is a non-volatile random-access memory (NVRAM). BIOS 104 interacts with OS 106 to manage the computing system. Conventionally, BIOS 104 includes SMM interrupt handler 107 to receive notification of SMIs and control handling of the SMIs and SWIM dispatcher 108 to call one or more SMM drivers 110 to handle the SMIs. In an embodiment, SMM interrupt handler error identifier (ID) 114 receives an SMM interrupt handler error ID from SMM interrupt handler 107 and SWIM dispatcher monitor flag 116 receives a status of SMM dispatcher 108. During SWIM, SMM error handler 112 reads SMM interrupt handler error ID 114 and SMM dispatcher monitor flag 116 and, as needed, creates one or more SMM error records 118. SWIM error records 118 may include SMM interrupt handler error ID 114 to specifically identify an error causing an unexpected reboot. In an embodiment, BIOS 104 provides a mechanism for OS 106 to be notified of and/or access SMM error records 118 after a reboot of computing system 100. OS may then notify the user of the specific error information contained in SWIM error records 118 and take corrective action as needed.

In some scenarios, a computing system may be unexpectedly rebooted when SMM dispatcher 108 is hung up or when SMM interrupt handler or one of SMM drivers 110 are hung up. In an embodiment, when SMM dispatcher monitor flag 116 is cleared, SMM operation is successful (e.g., SWIM entry, SMM processing, and SMM exit), and when SMM dispatcher monitor flag 116 is set, an error resulting in a reboot has occurred. If the SWIM dispatcher monitor flag 116 is set but SMM interrupt error ID 114 is null, then it may be inferred SMM dispatcher has hung up. If the SMM dispatcher monitor flag 116 is set and the SMM interrupt ID 114 is not null, then it may be inferred that either the SMM interrupt handler 107 or a SMM driver 110 has hung up, and SMM interrupt error ID 114 specifically identifies the error causing the unexpected reboot.

In an embodiment, a SMM error record 188 may be in the format of an advanced configuration and power interface (ACPI) power management specification and include a boot error record table (BERT) header table, generic error data header information, raw data header information (e.g., from a firmware source), generic error data (e.g., processor states, bus states, etc.), and raw error data (e.g., specific firmware error data). In an embodiment, the raw error data may include SMM interrupt handler error ID 114 and, optionally, SMM interrupt handler specific information (such as state changes, actions, etc.).

Figure 2:
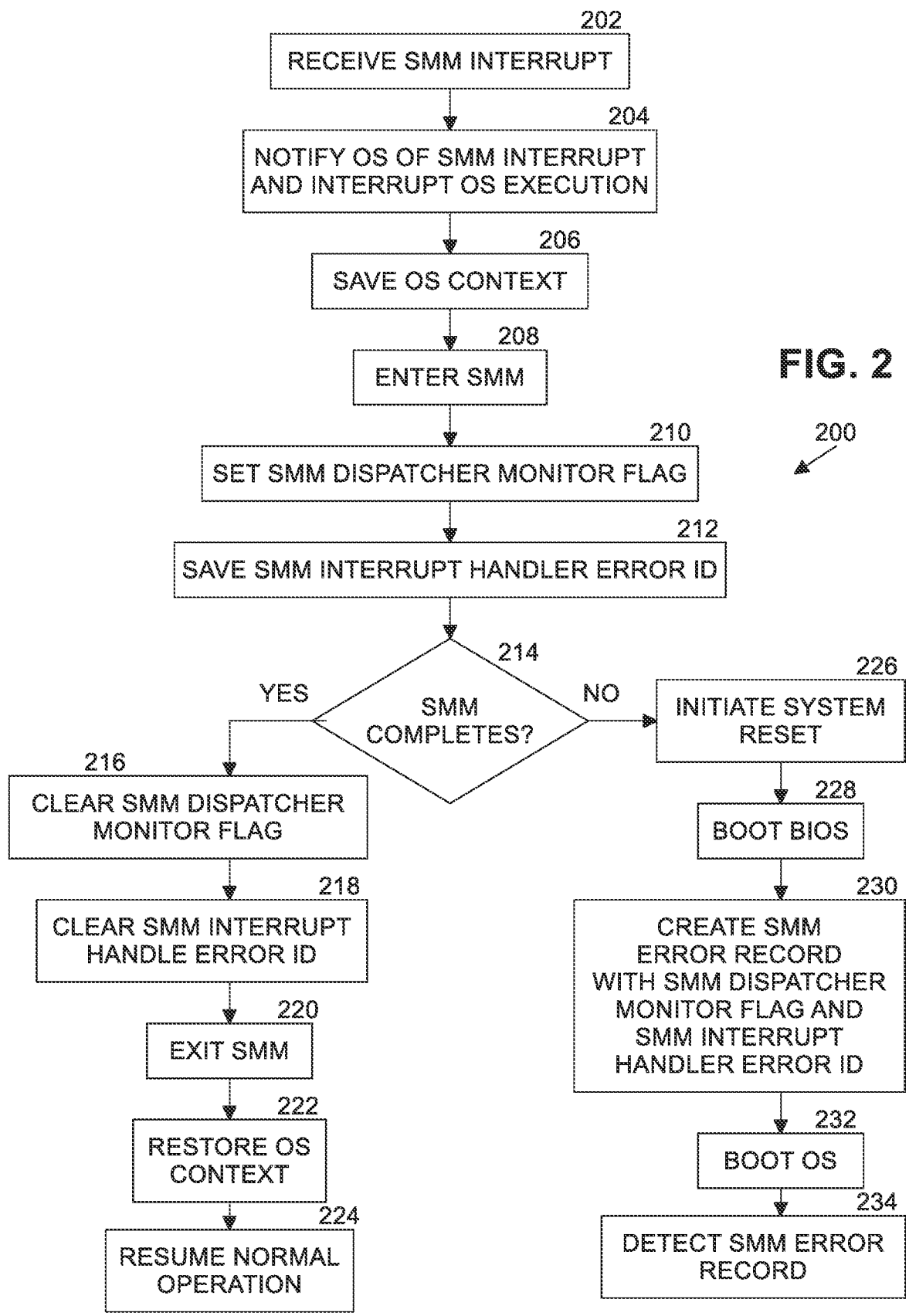
FIG. 2 is a flow diagram of a system management mode (SMM) error handling process according to some embodiments.

FIG. 2 is a flow diagram of a system management mode (SMM) error handling process 200 according to some embodiments. At block 202, BIOS 104 receives an SMM interrupt (e.g., an SMI). At block 204, BIOS 104 notifies the OS 106 of the SMM interrupt and OS execution is interrupted. At block 206, the processor context of the OS is saved. At block 208, the processor enters SMM. Upon entry into SMM, SMM dispatcher 108 sets SMM dispatcher monitor flag 116 to indicate entry into SMM. During SMM, SMM interrupt handler 107 attempts to handle an error causing the SMM by using SMM dispatcher 108 and one or more SMM drivers 110. At block 212, SMM error handler 112 saves the associated with the error being handled as SMM interrupt handler error ID 114. If SMM completes successfully at block 214 (e.g., SMM Interrupt Handler Error ID 114 and SMM dispatcher monitor flag 116 are not null or zero), SMM error handler 112 clears the SMM dispatcher monitor flag 116 at block 216 and clears the SMM interrupt handler error ID 114 (since no error information need be further communicated). Processing continues with exiting SMM at block 220, restoring the OS context at block 222, and resuming normal operation at block 224.

At block 214, if SMM does not complete successfully at block 214, this indicates that the error was not handled, and the processor initiates a system reset at block 226 (that is, an unexpected reboot because the system has hung up). At block 228, BIOS 104 is booted as part of the system reset. Once the BIOS 104 is operational again, SMM error handler 112 of BIOS 104 creates an SMM error record 118 with the SMM dispatcher monitor flag 116 and the SMM interrupt handler error ID 114. At block 232, the OS 106 is booted. Once the OS 106 is operational again, the OS may detect the existence or update of SMM error records 118. In an embodiment, BIOS 104 may provide access to SMM error records 118 to the OS 106. The OS may then read SMM error records 118 and communicate details of the error causing the unexpected reboot to the user, possible through the use of an event viewer in the OS.

As described above, this technology provides SMM error records (including SMM interrupt level details) in case of a system crash and reboot and guarantees the availability of SMM context information post recovery (e.g., post unexpected reboot).

While an example manner of implementing the computing system 100 of FIG. 1 is illustrated in FIG. 2, one or more of the elements, processes, and/or devices illustrated in FIGS. 1 and 2 may be combined, divided, re-arranged, omitted, eliminated, and/or implemented in any other way. Further, the example processor circuitry may be implemented by hardware, software, firmware, and/or any combination of hardware, software, and/or firmware. Thus, for example, any of the example processor circuitry, the example memory circuitry, the example communication interface circuitry, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example processor circuitry, the example memory circuitry, and/or the example communication interface circuitry is/are hereby expressly defined to include a non-transitory computer readable storage device or storage disk such as a memory, a digital versatile disk (DVD), a compact disk (CD), a Blu-ray disk, etc., including the software and/or firmware. Further still, the example circuitry of FIG. 1 may include one or more elements, processes, and/or devices in addition to, or instead of, those illustrated in FIG. 1, and/or may include more than one of any or all the illustrated elements, processes and devices.

Further, the example processor circuitry, the example memory circuitry, the example communication interface circuitry, the example firmware circuitry, the example embedded controller circuitry, and/or, more generally, the example circuitry of FIG. 1, may be implemented by hardware, software, firmware, and/or any combination of hardware, software, and/or firmware. Thus, for example, any of the example processor circuitry, the example memory circuitry, the example communication interface circuitry, the example firmware circuitry, the example embedded controller circuitry, and/or, the example circuitry, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example processor circuitry, the example memory circuitry, the example communication interface circuitry, the example firmware circuitry, and/or the example embedded controller circuitry is/are hereby expressly defined to include a non-transitory computer readable storage device or storage disk such as a memory, a digital versatile disk (DVD), a compact disk (CD), a Blu-ray disk, etc., including the software and/or firmware. Further still, the example circuitry of FIG. 1 may include one or more elements, processes, and/or devices in addition to, or instead of, those illustrated in FIG. 1, and/or may include more than one of any or all the illustrated elements, processes and devices.

A flowchart representative of example hardware logic circuitry, machine-readable instructions, hardware implemented state machines, and/or any combination thereof for implementing the system 100 of FIG. 1 is shown in FIG. 2. The machine-readable instructions may be one or more executable programs or portion(s) of an executable program for execution by processor circuitry, such as the processor circuitry 312 shown in the example processor platform 300 discussed below in connection with FIG. 3 and/or the example processor circuitry discussed below in connection with FIGS. 4 and/or 5. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 2, many other methods of implementing the example computing system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 2 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
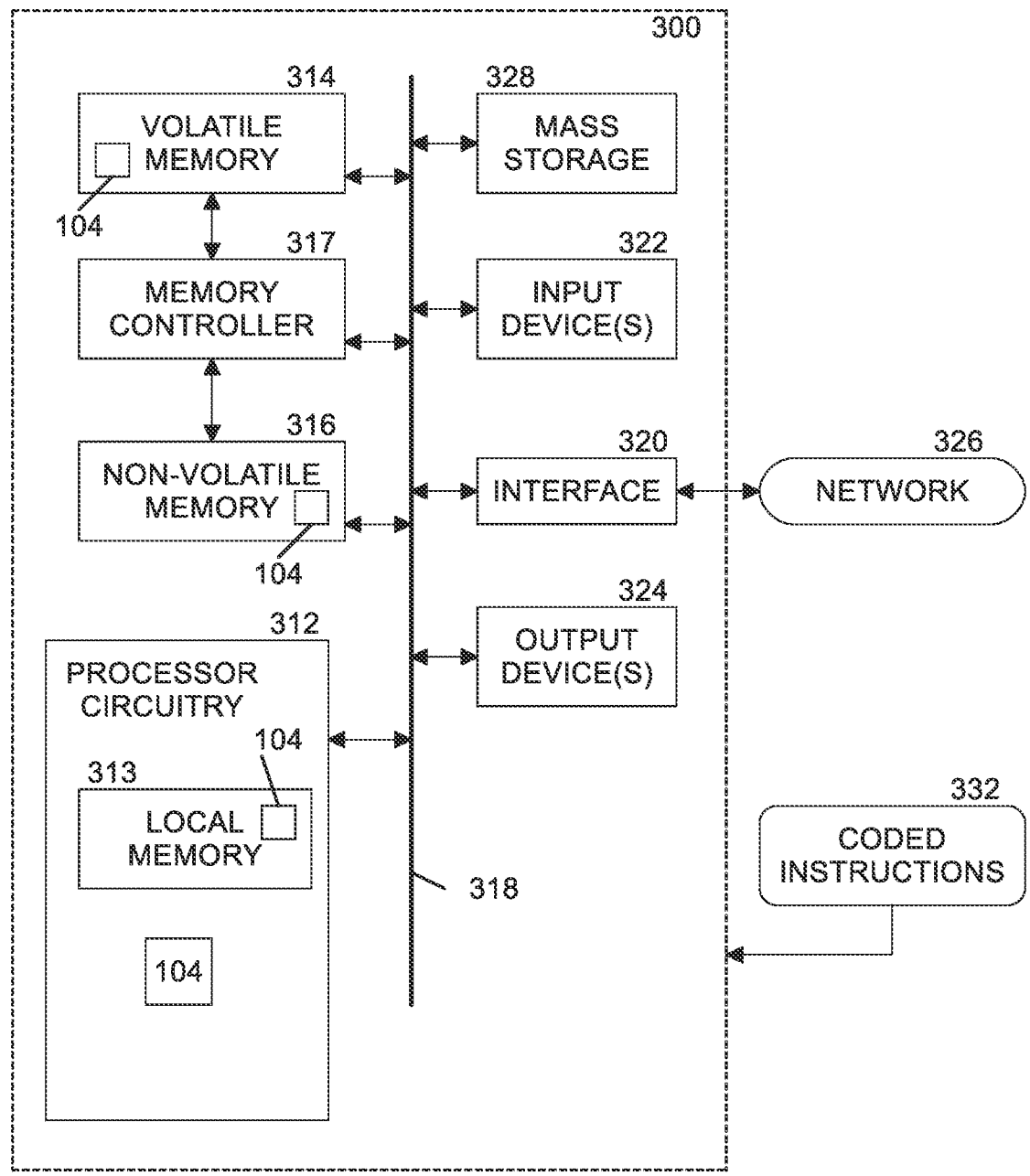
FIG. 3 is a block diagram of an example processor platform structured to execute and/or instantiate the machine-readable instructions and/or operations of FIG. 2 to implement the apparatus discussed with reference to FIG. 1.

FIG. 3 is a block diagram of an example processor platform 1000 structured to execute and/or instantiate the machine-readable instructions and/or operations of FIG. 2 to implement the apparatus of FIG. 1. The processor platform 300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 300 of the illustrated example includes processor circuitry 312. The processor circuitry 312 of the illustrated example is hardware. For example, the processor circuitry 312 can be implemented by one or more integrated circuits, logic circuits, FPGAs microprocessors, CPUs, GPUs, DSPs, and/or microcontrollers from any desired family or manufacturer. The processor circuitry 312 may be implemented by one or more semiconductor based (e.g., silicon based) devices.

The processor circuitry 312 of the illustrated example includes a local memory 313 (e.g., a cache, registers, etc.). The processor circuitry 312 of the illustrated example is in communication with a main memory including a volatile memory 314 and a non-volatile memory 316 by a bus 318. The volatile memory 314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 316 may be implemented by flash memory (such as flash memory 102) and/or any other desired type of memory device. Access to the main memory 314, 316 of the illustrated example is controlled by a memory controller 317.

The processor platform 300 of the illustrated example also includes interface circuitry 320. The interface circuitry 320 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 322 are connected to the interface circuitry 320. The input device(s) 322 permit(s) a user to enter data and/or commands into the processor circuitry 312. The input device(s) 322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 324 are also connected to the interface circuitry 320 of the illustrated example. The output devices 324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 320 of the illustrated example, thus, typically includes a graphics driver card, a graphics driver chip, and/or graphics processor circuitry such as a GPU.

The interface circuitry 320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 300 of the illustrated example also includes one or more mass storage devices 328 to store software and/or data. Examples of such mass storage devices 328 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 332, which may be implemented by the machine-readable instructions of FIG. 2, may be stored in the mass storage device 328, in the volatile memory 314, in the non-volatile memory 316, and/or on a removable non-transitory computer readable storage medium such as a CD or DVD.

Figure 4:
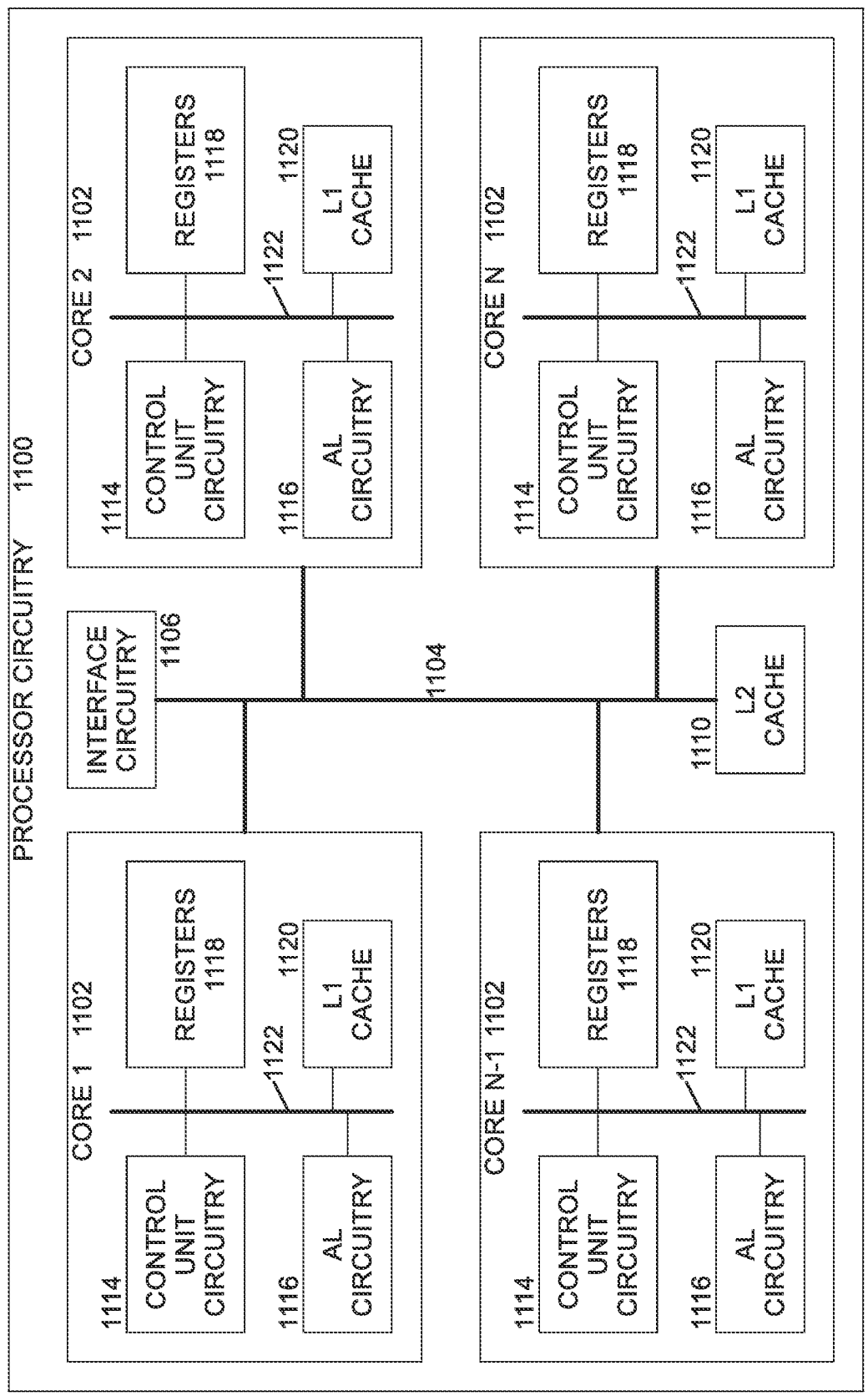
FIG. 4 is a block diagram of an example implementation of the processor circuitry of FIG. 3.

FIG. 4 is a block diagram of an example implementation of the processor circuitry 312 of FIG. 3. In this example, the processor circuitry 312 of FIG. 3 is implemented by a microprocessor (e.g., processor circuitry 1100). For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine-readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine-readable instructions and/or operations represented by the flowchart of FIG. 2.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 314, 316 of FIG. 3). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank. Alternatively, the registers 1118 may be organized in any other arrangement, format, or structure including distributed throughout the core 1102 to shorten access time. The bus 1122 may implement at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general-purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 5:
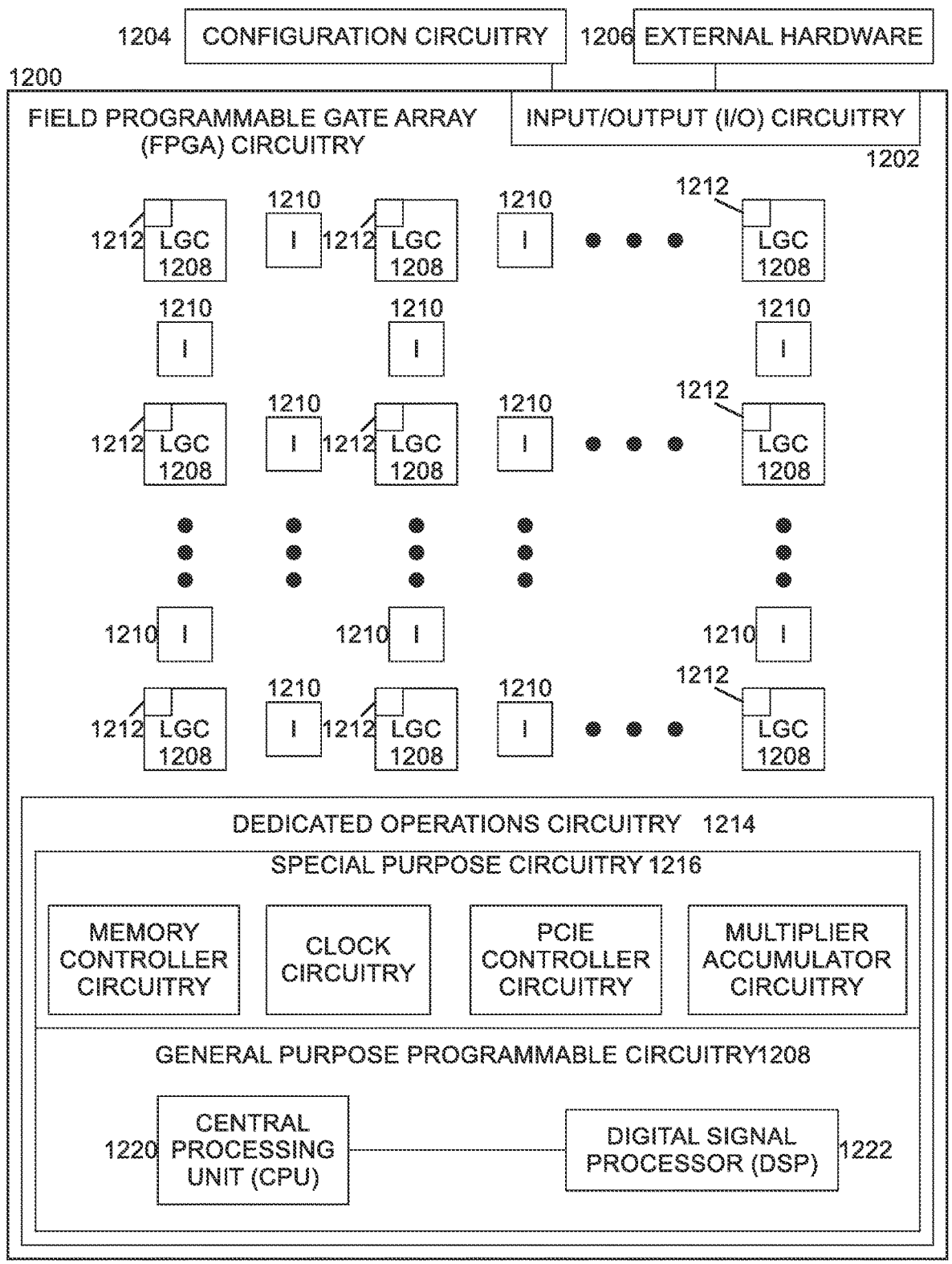
FIG. 5 is a block diagram of another example implementation of the processor circuitry of FIG. 3.

FIG. 5 is a block diagram of another example implementation of the processor circuitry 312 of FIG. 3. In this example, the processor circuitry 312 is implemented by FPGA circuitry 1200. The FPGA circuitry 1200 can be used, for example, to perform operations that could otherwise be performed by the example microprocessor 1100 of FIG. 4 executing corresponding machine-readable instructions. However, once configured, the FPGA circuitry 1200 instantiates the machine-readable instructions in hardware and, thus, can often execute the operations faster than they could be performed by a general purpose microprocessor executing the corresponding software.

More specifically, in contrast to the microprocessor 1100 of FIG. 4 described above (which is a general purpose device that may be programmed to execute some or all of the machine-readable instructions represented by the flowchart of FIG. 2 but whose interconnections and logic circuitry are fixed once fabricated), the FPGA circuitry 1200 of the example of FIG. 5 includes interconnections and logic circuitry that may be configured and/or interconnected in different ways after fabrication to instantiate, for example, some or all of the machine-readable instructions represented by the flowchart of FIG. 2. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowchart of FIG. 2. As such, the FPGA circuitry 1200 may be structured to effectively instantiate some or all of the machine-readable instructions of the flowchart of FIG. 2 as dedicated logic circuits to perform the operations corresponding to those software instructions in a dedicated manner analogous to an ASIC. Therefore, the FPGA circuitry 1200 may perform the operations corresponding to the some or all of the machine-readable instructions of FIG. 2 faster than the general-purpose microprocessor can execute the same.

In the example of FIG. 5, the FPGA circuitry 1200 is structured to be programmed (and/or reprogrammed one or more times) by an end user by a hardware description language (HDL) such as Verilog. The FPGA circuitry 1200 of FIG. 5, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine-readable instructions to configure the FPGA circuitry 1200, or portion(s) thereof. In some such examples, the configuration circuitry 1204 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 4. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine-readable instructions of FIG. 2 and/or other desired operations. The logic gate circuitry 1208 shown in FIG. 5 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors)

whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 5 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 4 and 5 illustrate two example implementations of the processor circuitry 312 of FIG. 3, many other approaches are contemplated. For example, as mentioned above, modern FPGA circuitry may include an on-board CPU, such as one or more of the example CPU 1220 of FIG. 5. Therefore, the processor circuitry 312 of FIG. 3 may additionally be implemented by combining the example microprocessor 1100 of FIG. 4 and the example FPGA circuitry 1200 of FIG. 5. In some such hybrid examples, a first portion of the machine-readable instructions represented by the flowchart of FIG. 2 may be executed by one or more of the cores 1102 of FIG. 4 and a second portion of the machine-readable instructions represented by the flowchart of FIG. 2 may be executed by the FPGA circuitry 1200 of FIG. 5.

In some examples, the processor circuitry 312 of FIG. 3 may be in one or more packages. For example, the processor circuitry 1100 of FIG. 4 and/or the FPGA circuitry 1200 of FIG. 5 may be in one or more packages. In some examples, an XPU may be implemented by the processor circuitry 312 of FIG. 3, which may be in one or more packages. For example, the XPU may include a CPU in one package, a DSP in another package, a GPU in yet another package, and an FPGA in still yet another package.

Figure 6:
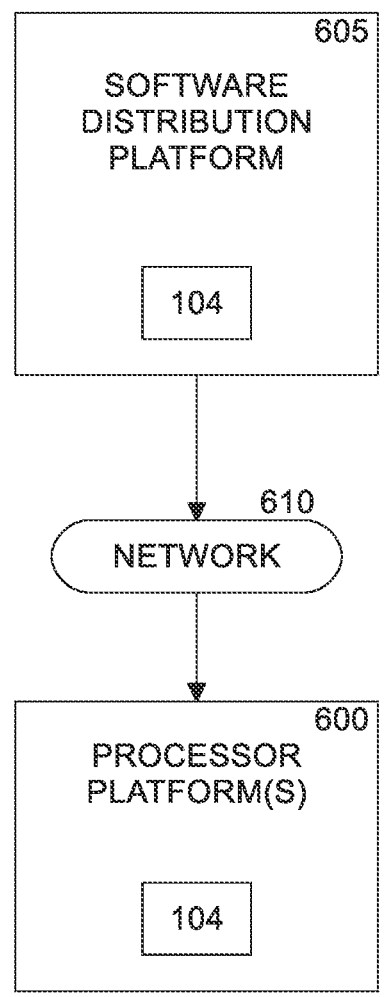
FIG. 6 is a block diagram illustrating an example software distribution platform to distribute software such as the example machine-readable instructions of FIG. 2 to hardware devices owned and/or operated by third parties.

A block diagram illustrating an example software distribution platform 1305 to distribute software such as the example machine-readable instructions 332 of FIG. 3 to hardware devices owned and/or operated by third parties is illustrated in FIG. 6. The example software distribution platform 1305 may be implemented by any computer server, data facility, cloud service, etc., capable of storing and transmitting software to other computing devices. The third parties may be customers of the entity owning and/or operating the software distribution platform 605. For example, the entity that owns and/or operates the software distribution platform 605 may be a developer, a seller, and/or a licensor of software such as the example machine-readable instructions of BIOS 104 of FIG. 1. The third parties may be consumers, users, retailers, OEMs, etc., who purchase and/ or license the software for use and/or re-sale and/or sub-licensing. In the illustrated example, the software distribution platform 605 includes one or more servers and one or more storage devices. The storage devices store the machine-readable instructions of BIOS 104, which may correspond to the example machine-readable instructions for FIG. 2, as described above. The one or more servers of the example software distribution platform 605 are in communication with a network 610, which may correspond to any one or more of the Internet and/or any of the example networks, etc., described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine-readable instructions of BIOS 104 from the software distribution platform 605. For example, the software, which may correspond to the example machine-readable instructions for BIOS 104, may be downloaded to the example processor platform 300, which is to execute the machine-readable instructions 332 to implement the process 200 and associated system 100. In some examples, one or more servers of the software distribution platform 605 periodically offer, transmit, and/or force updates to the software (e.g., the example machine-readable instructions 332 of FIG. 3) to ensure improvements, patches, updates, etc., are distributed and applied to the software at the end user devices.

In some examples, an apparatus includes means for processing SMI interrupts and unexpected reboots. For example, the means for processing may be implemented by processor circuitry, processor circuitry, firmware circuitry, etc. In some examples, the processor circuitry may be implemented by machine executable instructions such as that implemented by at least blocks of FIG. 2 executed by processor circuitry, which may be implemented by the example processor circuitry 312 of FIG. 3, the example processor circuitry 1100 of FIG. 4, and/or the example Field Programmable Gate Array (FPGA) circuitry 1200 of FIG. 5. In other examples, the processor circuitry is implemented by other hardware logic circuitry, hardware implemented state machines, and/or any other combination of hardware, software, and/or firmware. For example, the processor circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

From the foregoing, it will be appreciated that example systems, methods, apparatus, and articles of manufacture have been disclosed that provide improved firmware updates. The disclosed systems, methods, apparatus, and articles of manufacture improve the efficiency of using a computing device by determining availability of resources needed to update firmware in a computing system; updating the firmware in the computing system when the resources are available; and deferring updating the firmware when the resources are not available. The disclosed systems, methods, apparatus, and articles of manufacture are accordingly directed to one or more improvement(s) in the operation of a machine such as a computer or other electronic and/or mechanical device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the examples of this patent.

What is claimed is:

1. A method comprising:
   upon entering a mode of a processor that is not visible to an operating system (OS), setting a flag indicating entry into the mode and saving an identifier (ID) of an error causing entry into the mode; and
   responsive to an initiation of a system reset while in the mode, booting a basic input/output system (BIOS), creating an error record to be accessible to the OS after booting, the error record including the flag and the error ID, and booting the OS.

2. The method of claim 1, wherein the mode not visible by an OS is a system management mode (SMM).

3. The method of claim 1, comprising, when mode processing is successfully completed, clearing the flag and the error ID and exiting the mode.

4. The method of claim 1, wherein the system reset is initiated when one of a dispatcher, an interrupt handler, or a driver is hung up.

5. The method of claim 4, wherein the error record includes interrupt handler-specific information when the interrupt handler is hung up.

6. The method of claim 4, wherein responsive to the flag being set and the error ID being null, the error record includes notification that the dispatcher has hung up.

7. The method of claim 1, wherein the BIOS stores the error record in a non-volatile memory for access by the OS after booting.

8. At least one computer-readable storage medium comprising instructions which, when executed, cause at least one processor to at least:
   upon entering a mode of a processor that is not visible to an operating system (OS), set a flag indicating entry into the mode and save an identifier (ID) of an error causing entry into the mode; and
   responsive to a system reset initiation while in the mode, boot a basic input/output system (BIOS), create an error record to be accessible to the OS after booting, the error record including the flag and the error ID, and boot the OS.

9. The at least one computer-readable storage medium of claim 8, wherein the mode not visible by an OS is a system management mode (SMM).

10. The at least one computer-readable storage medium of claim 8 comprising instructions which, when executed, cause at least one processor to at least, when mode processing is successfully completed, clear the flag and the error ID.

11. The at least one computer-readable storage medium of claim 8 comprising instructions which, when executed, cause at least one processor to at least initiate a system reset when one of a dispatcher, an interrupt handler, or a driver is hung up.

12. The at least one computer-readable storage medium of claim 11, wherein the error record includes interrupt handler-specific information when the interrupt handler is hung up.

13. The at least one computer-readable storage medium of claim 11, wherein responsive to the flag being set and the error ID being null, the error record includes notification that the dispatcher has hung up.

14. The at least one computer-readable storage medium of claim 8 comprising instructions which, when executed, cause at least one processor to at least store the error record in a non-volatile memory for access by the OS after booting.

15. A system comprising:
   a processor to execute instructions of an operating system (OS); and
   a non-volatile memory to store a basic input/output system (BIOS), the processor to execute instructions of the BIOS, whereupon upon entering a mode of a processor that is not visible to the OS, set a flag indicating entry into the mode and save an identifier (ID) of an error causing entry into the mode; and responsive to an initiation of a system reset while in the mode, boot the BIOS, create an error record to be accessible to the OS after booting, the error record including the flag and the error ID, and boot the OS.

16. The system of claim 15, wherein the mode not visible by an OS is a system management mode (SMM).

17. The system of claim 15, comprising, when mode processing is successfully completed, the BIOS to clear the flag and the error ID and the processor is to exit the mode.

18. The system of claim 15, wherein the system reset is initiated when one of a dispatcher, an interrupt handler, or a driver is hung up.

19. The system of claim 18, wherein the error record includes interrupt handler-specific information when the interrupt handler is hung up.

20. The system of claim 18, wherein when the flag is set and the error ID is null, the error record includes notification that the dispatcher has hung up.

21. The system of claim 15, wherein the BIOS is to store the error record in the non-volatile memory for access by the OS after booting.

* * * * *